United States Patent [19]
Nielsen et al.

[11] Patent Number: 5,570,241
[45] Date of Patent: Oct. 29, 1996

[54] SINGLE CHANNEL, MULTIPLE HEAD SERVO WRITING WITH EMBEDDED HEAD IDENTIFICATION

[75] Inventors: Charles R. Nielsen, San Jose; Charles A. Bates, Saratoga; Matthew W. Rooke, San Jose; Fred R. Hansen, Newark; Paul T. Petersen, Santa Clara; Me V. Le, Milpitas; Eugene K. Lew, Cupertino, all of Calif.

[73] Assignee: Conner Peripherals, Inc., San Jose, Calif.

[21] Appl. No.: 449,123

[22] Filed: May 24, 1995

[51] Int. Cl.[6] .................................. G11B 5/09; G11B 5/02
[52] U.S. Cl. ................................... 360/46; 360/51; 360/68
[58] Field of Search ................................ 360/46, 68, 51

[56] References Cited

U.S. PATENT DOCUMENTS

5,422,760  6/1995  Abbott et al. ........................ 360/65 X

Primary Examiner—W. Chris Kim
Attorney, Agent, or Firm—Kinney & Lange, P.A.

[57] ABSTRACT

A write drive logic circuit is described. The write driver logic circuit comprises a set of write drivers, with each one of the set of write drivers having an input and an output, such that each write driver is responsive to an input signal applied to the input to provide a write output signal at the output as a function of the input signal. A set of memory devices (e.g. shift registers) is provided, one for each write driver. Each one of the shift registers stores unique head identification information and includes an output to controllably output a signal representative of the unique head identification information. Furthermore, each one of a set of multiplexers includes an output, a first input coupled to a corresponding one of the outputs of the set of shift registers to receive the signal representative of the unique identification information stored in the respective shift register and a second input coupled to a common write data line that transmits a signal representative of preselected information. The output of each one of the set of multiplexers is coupled to the input of a corresponding one of the set of write drivers such that one of the first and second inputs of the multiplexer is selectively applied to the input of the corresponding write driver.

20 Claims, 5 Drawing Sheets

SINGLE CHANNEL, MULTIPLE HEAD SERVO WRITING WITH EMBEDDED HEAD IDENTIFICATION

FIELD OF THE INVENTION

The present invention is directed to disk drives. More particularly, the present invention provides a single channel, multiple head servo writing system that embeds unique head identification information in servo sectors.

BACKGROUND OF THE INVENTION

Disk drives are commonly used in workstations, personal computers, laptops and other computer systems to store large amounts of data in a form that can be made readily available to a user. In general, a disk drive comprises a magnetic disk that is rotated by a spindle motor. The surface of the disk is divided into a series of data tracks. The data tracks are spaced radially from one another across a band having an inner diameter and an outer diameter. Each of the data tracks extends generally circumferentially around the disk and can store data in the form of magnetic transitions within the radial extent of the track on the disk surface. Typically, each data track is divided into a number of data sectors that store fixed sized data blocks.

A head includes an interactive element, such as a magnetic transducer, that is used to sense the magnetic transitions to read data, or to conduct an electrical signal that causes a magnetic transition on the disk surface, to write data.

The magnetic transducer includes a read/write gap that positions the active elements of the transducer at a position suitable for interaction with the magnetic transitions on the surface of the disk, as the disk rotates.

In accordance with known disk drive design, the head is electrically coupled to a pre-amplifier. During a read operation, electrical signals transduced by the transducer from the magnetic transitions on the disk surface, are processed by the pre-amplifier and transmitted to a read/write channel in the disk drive for eventual transmission to a host computer using the disk drive to store data. During a write operation, electrical signals representative of data are received by the read/write channel from the host computer for transmission to the preamplifier. The pre-amplifier includes a write driver electrically coupled to the head transducer to transmit the signals corresponding to the data to the head. The head is responsive to the signals received from the write driver to conduct a current and thereby cause magnetic transitions on the disk surface corresponding to the data.

As known in the art, the magnetic transducer is mounted by the head to a rotary actuator arm and is selectively positioned by the actuator arm over a preselected data track of the disk to either read data from or write data to the preselected data track of the disk, as the disk rotates below the transducer. The head structure includes a slider having an air bearing surface that causes the transducer to fly above the data tracks of the disk surface due to fluid currents caused by rotation of the disk.

In modern high capacity disk drives, the spindle motor is arranged to mount a stack of axially aligned storage disks, with the storage disks in the stack being spaced from one another. The use of multiple disks increases the total disk surface available for the storage of data. A head stack assembly comprises a stack of actuator arms, each mounting a head or a pair of heads. The stack of actuator arms is arranged adjacent the slack of storage disks with each head being positioned by the respective actuator arm over the surface of a corresponding one of the disks.

Two aspects of conventional disk drive design are position control of the heads and address headers for the data sectors recorded in the data tracks. The position control is used to accurately position a head over a data track for data read or write operations. Address headers are used to provide unique identification information for data stored in a particular data sector.

Whenever data are either written to or read from a particular data track, the transducer gap of the corresponding head must be centered over the centerline of the magnetic transitions of the data track where the data are to be written or from where the data are to be read, to assure accurate transduction of the transitions representing data. If the head is off-center, the head may transduce transitions from an adjacent track.

A servo system is typically used to control the position of the actuator arm to insure that the head is properly centered over the magnetic transitions during either a read or write operation. In a known servo system, servo position information is recorded on the disk surface itself, and periodically read by the head for use in controlling the position of the actuator arm. Such a servo arrangement is referred to as an embedded servo system. In modern disk drive architectures utilizing an embedded servo, each data track is divided into a number of data sectors for storing fixed sized data blocks, one per sector, as noted above. In addition, associated with the data sectors are a series of servo sectors that are generally equally spaced around the circumference of the data track. The servo sectors can be arranged between data sectors or arranged independently of the data sectors such that the servo sectors split data fields of the data sectors, as is well known.

Each servo sector contains magnetic transitions that are arranged relative to a track centerline such that signals derived from the transitions can be used to determine head position. For example, the servo information can comprise two separate bursts of magnetic transitions, one recorded on one side of the track centerline and the other recorded on the opposite side of the track centerline. Whenever a head is over a servo sector, the head reads each of the servo bursts and the signals resulting from the transduction of the bursts are transmitted to, e.g., a microprocessor within the disk drive for processing.

When the head is properly positioned over a track centerline, the head will straddle the two bursts, and the strength of the combined signals transduced form the burst on one side of the track centerline will equal the strength of the combined signals transduced form the burst on the other side of the track centerline. The microprocessor can be used to subtract one burst value form the other each time a servo sector is read by the head. When the result is zero, the microprocessor will know that the two signals are equal, indicating that the head is properly positioned.

If the result is other than zero, then one signal is stronger than the other, indicating that the head is displaced from the track centerline and overlying one of the bursts more than the other. The magnitude and sign of the subtraction result can be used by the microprocessor to determine the direction and distance the head is displaced from the track centerline, and generate a control signal to move the actuator back towards the centerline.

In a conventional disk drive design, each data sector of a data track is divided into a number of fields, including an address header field that contains magnetic transitions representing unique identification information for the specific data stored in the data sector. In this manner, the disk drive system can locate and verify the exact data sector for any particular block of data that a host computer may require, e.g., in a read operation. Among the information stored in an address header field is head identification information to uniquely identify the particular head of the head stack assembly that is transducing the magnetic transitions. During certain types of disk drive failures or error conditions, the electronics system in the disk drive is unable to identify which particular head is transducing magnetic transitions. The head identification information can then be read by the active head and used to determine which disk surface is being read.

Overhead refers to portions of a disk surface that are used to store information necessary for the control of the disk drive. Space on a disk surface used to store control information is not available to store data, and thus reduces the storage capacity of the disk drive. The servo sectors and address headers discussed above are examples of overhead. One proposal for increasing the storage capacity of a disk drive is referred to as a headerless format. In a headerless format, the headers are removed from the data fields to reduce overhead and thereby free up additional space on the disk surfaces that can then be used to store data. The headers are stored in RAM memory available in the disk drive electronics system. Careful monitoring of clock signals is relied upon to associate the data fields on the disk surface with the complementary headers containing the unique identification information.

In a headerless format, there is a risk that data cannot be located. For example, during a failure condition of the type discussed above, the electronics system of the disk drive would not be able to identify which head is active, and the lack of headers recorded on the disk surface leaves the electronics system without a source of unique identification information. A solution to this problem is to record the head identification information portion of the header within the servo sectors.

One step in the process of manufacturing a disk drive is a servo writing operation when first installed, the disks are blank, and the servo writing operation involves the performance of a series of writes to all the disk surfaces to record the servo sectors. The most efficient form of servo writing involves simultaneous activation of the heads of the head stack assembly for parallel writing of servo patterns. Since the disks are stacked by the spindle motor in an axially aligned arrangement, the data tracks of the disks, as defined by servo position information in the servo sectors, can be aligned with one another. Ordinarily, the servo pattern used for any particular data track can be common in content to all servo sectors of a set of data tracks that are axially aligned with the particular data track. Thus, the heads of the head stack assembly can be activated in parallel, via an external pre-amp parallel write or an internal multi-head write, to simultaneously record servo patterns on the aligned set of data tracks, using common servo information input from a single servo write channel.

However, in the headerless format described above, each head must record, in addition to the common servo pattern, head identification information that is unique to that head. Accordingly, a conventional parallel write is not feasible. A serial or staggered write does permit each head to record unique identification information, but results in a significant increase in servo write time since the servo sectors would be recorded one head at a time. Such an increase in servo write time can be seriously detrimental to a commercially viable disk drive mass production operation. Thus, there is a need for a servo write system that implements a parallel write operation for maximum efficiency in a disk drive manufacturing operation, while permitting the writing of unique identification information by each head.

SUMMARY OF THE INVENTION

The present invention provides a servo format and a pre-amplifier circuit that can write a common servo pattern with multiple heads of the head stack assembly, and also selectively control the heads, at certain times, to simultaneously, but separately, write identification information that is unique to each head. In accordance with the present invention, unique identification information is stored for each head in a manner whereby the unique identification information for any particular head can be controllably transmitted to that head for writing to a corresponding disk surface. In addition, a common write data line is coupled to the heads for simultaneous, parallel transmission of common servo information to all of the heads for simultaneous writing of servo sectors on the disk surfaces.

Logic is added to the pre-amplifier to select, at any particular time during a servo write operation, either the write data line or the unique identification information for input to the heads. When the write data line is selected by the logic as an input to the heads, the common servo information is input to all of the heads for a simultaneous, parallel write of the servo sectors on the disk surfaces. When the unique identification information is selected by the logic as an input to the heads, the unique identification for each head is input to the respective head, and all the heads are activated simultaneously so that each head writes its corresponding unique identification information to at least one servo sector of the respective disk surface.

The present invention achieves parallel operation of the heads for fast and efficient servo writing, while also accommodating a parallel recording of information that varies from head to head. A commercially viable disk drive mass production process can be implemented with a servo write operation utilizing the present invention to provide servo sectors with embedded information to uniquely identify the heads associated with the respective disk surfaces. This, in turn, makes a headerless format feasible since the unique identification information embedded in the servo sectors minimizes the possibility of misplaced data.

DETAILED DESCRIPTION

Figure 1:
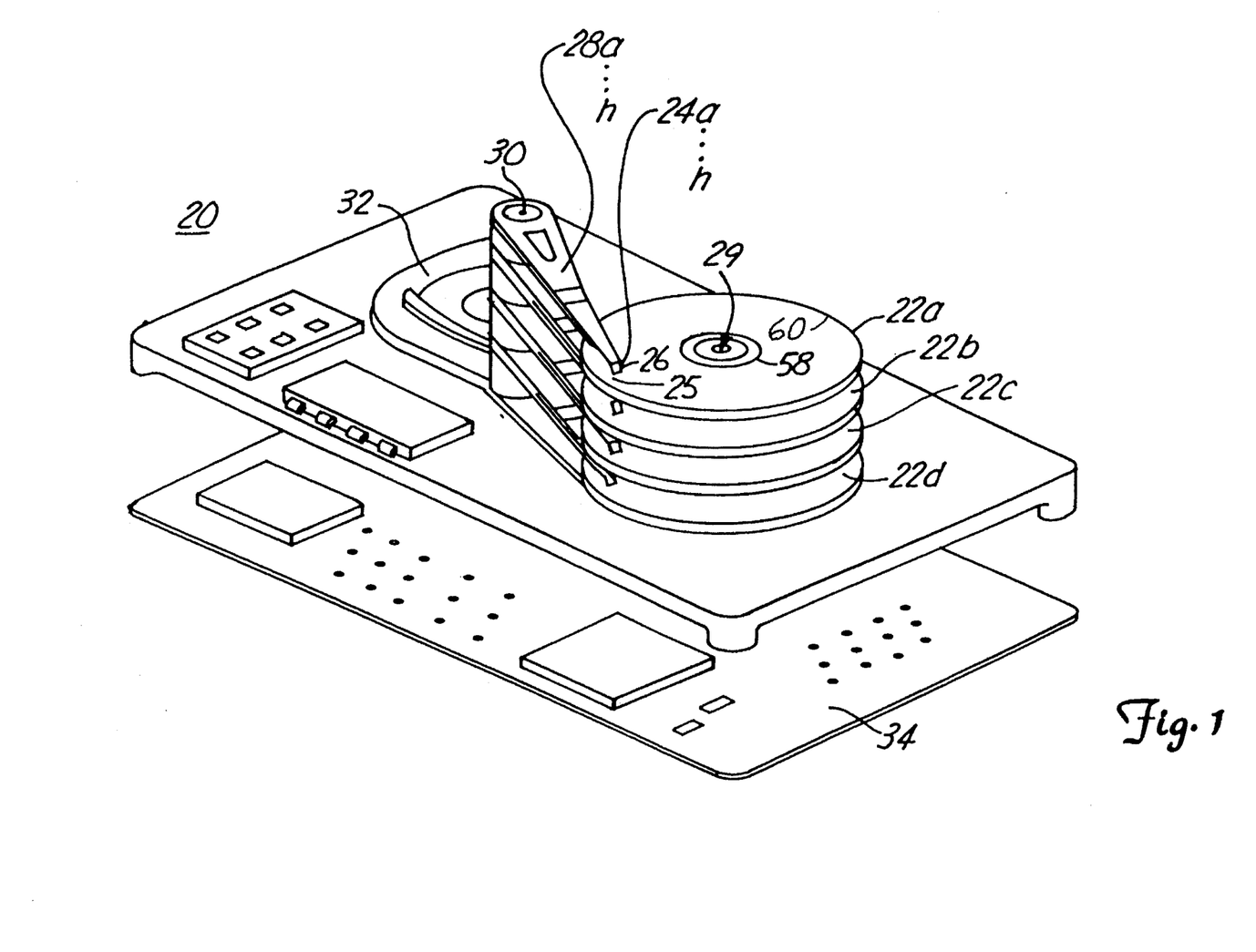
FIG. 1 is perspective view of an exemplary disk drive.

Referring now to the drawings, and initially to FIG. 1, there is illustrated an example of a disk drive designated generally by the reference numeral 20. The disk drive 20 includes a plurality of storage disks 22a–d and a plurality of read/write heads 24a–h. Each of the storage disks 22a–d is provided with a plurality of data tracks to store user data. As illustrated in FIG. 1, one head is provided for each surface of each of the disks 22a–d such that data can be read from or written to the data tracks of all of the storage disks. It should be understood that the disk drive 20 is merely representative of a disk drive system utilizing the present invention and that the present invention can be implemented in a disk drive system including more or less storage disks.

The storage disks 22a–d are mounted for rotation by a spindle motor arrangement 29, as is known in the art. Moreover, the read/write heads 24a–h are supported by respective actuator arms 28a–h for controlled positioning over preselected radii of the storage disks 22a–d to enable the reading and writing of data from and to the data tracks.

To that end, the actuator arms 28a–h are rotatably mounted on a pin 30 by a voice coil motor 32 operable to controllably rotate the actuator arms 28a–h radially across the disk surfaces.

Each of the read/write heads is mounted to a respective actuator arm 28a–h by a flexure element (not shown) and comprises a magnetic transducer 25 mounted to a slider 26 having an air bearing surface (not shown), all in a known manner. As typically utilized in disk drive systems, the sliders 26 cause the magnetic transducers 25 of the read/write heads 24a–h to "fly" above the surfaces of the respective storage disks 22a–d for non-contact operation of the disk drive system, as discussed above. When not in use, the voice coil motor 32 rotates the actuator arms 28a–h during a contact stop operation, to position the read/write heads 24a–h over a respective landing zone 58 or 60, where the read/write heads 24a–h come to rest on the storage disk surfaces. As should be understood, each of the read/write heads 24a–h is at rest on a respective landing zone 58 or 60 at the commencement of a contact start operation.

A printed circuit board (PCB) 34 is provided to mount control electronics for controlled operation of the spindle motor 29 and the voice coil motor 32. The PCB 34 also includes read/write channel circuitry coupled to the read/write heads 24a–h, to control the transfer of data to and from the data tracks of the storage disks 22a–d. To that end, a pre-amplifier 31 is mounted adjacent the voice coil motor 32 to electrically couple the heads 24a–h to the read/write channel circuitry. The pre-amplifier 31 includes an amplification stage to amplify electrical signals transduced by a head during a read operation, and a write driver arrangement to transmit a current to a head in a write operation. The manner for coupling the PCB 34 to the various components of the disk drive is well known in the art.

Figure 2:
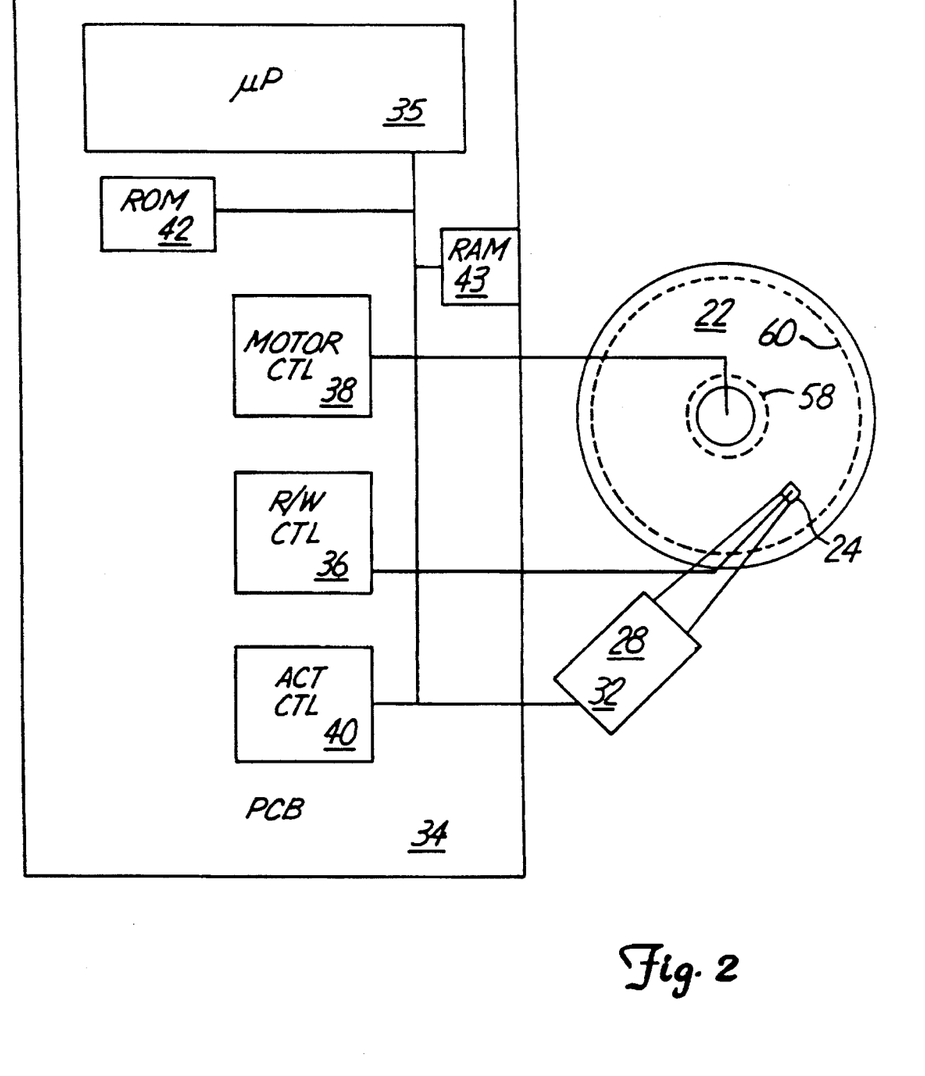
FIG. 2 is a top plan view of the printed circuit board of the disk drive of FIG. 1.

Referring now to FIG. 2, there is illustrated in schematic form the PCB 34 and the electrical couplings between the control electronics on the PCB 34 and the components of the disk drive system described above. A microprocessor 35 is coupled to each of a read/write control 36, spindle motor control 38, actuator control 40, ROM 42 and RAM 43. In modern disk drive designs, the microprocessor can comprise a digital signal processor (DSP). The microprocessor 35 sends data to and receives data from the storage disks 22a–d via the read/write control 36 and the read/write heads 24a–h.

The microprocessor 35 also operates according to instructions stored in the ROM 42 to generate and transmit control signals to each of the spindle motor control 38 and the actuator control 40.

The spindle motor control 38 is responsive to the control signals received from the microprocessor 35 to generate and transmit a drive voltage to the spindle motor 29 to cause the storage disks 22a–d to rotate at an appropriate rotational velocity.

Similarly, the actuator control 40 is responsive to the control signals received from the microprocessor 35 to generate and transmit a voltage to the voice coil motor 32 to controllably rotate the read/write heads 24a–h, via the actuator arms 28a–h, to preselected radial positions over the storage disks 22a–d. The magnitude and polarity of the voltage generated by the actuator control 40, as a function of the microprocessor control signals, determines the radial direction and speed of the read/write heads 24a–h.

When data to be written or read from one of the storage disks 22a–d are stored on a data track different from the current radial position of the read/write heads 24a–h, the microprocessor 35 determines the current radial position of the read/write heads 24a–h and the radial position of the data track where the read/write heads 24a–h are to be relocated. The microprocessor 35 then implements a seek operation wherein the control signals generated by the microprocessor 35 for the actuator control 40 cause the voice coil motor 32 to move the read/write heads 24a–h from the current data track to a destination data track at the desired radial position.

When the actuator has moved the read/write heads 24a–h to the destination data track, the pre-amplifier 31 is used to couple the head 24a–h over the specific data track to be written or read, to the read/write control 36, as is generally known in the art. The read/write control 36 includes a read channel that, in accordance with modern disk drive design, comprises an electronic circuit that detects information represented by magnetic transitions recorded on the disk surface within the radial extent of the selected data track. As described above, each data track is divided into a number of data sectors.

During a read operation, electrical signals transduced by the head from the magnetic transitions of the data sectors are amplified by the pre-amplifier 31 and input to the read channel of the read/write control 36 for processing. The RAM 43 can be used to buffer data read from or to be written to the data sectors of the storage disks 22a–d via the read/write control 36. The buffered data can be transferred to or from a host computer utilizing the disk drive for data storage.

Figure 3A:
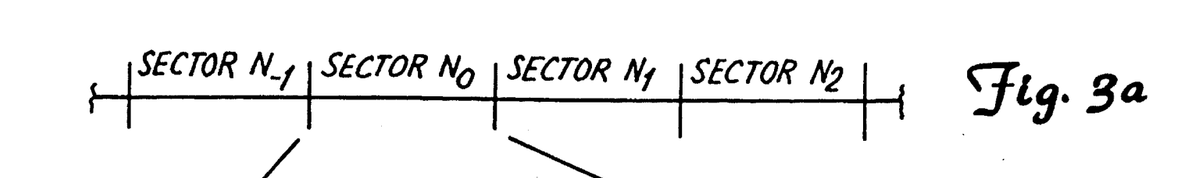
FIGS. 3a–c present a diagrammatic explosion of the format and constituency of a representative data sector of the prior art, as recorded within the data tracks of the disks of the disk drive of FIG. 1.
Figure 3B:
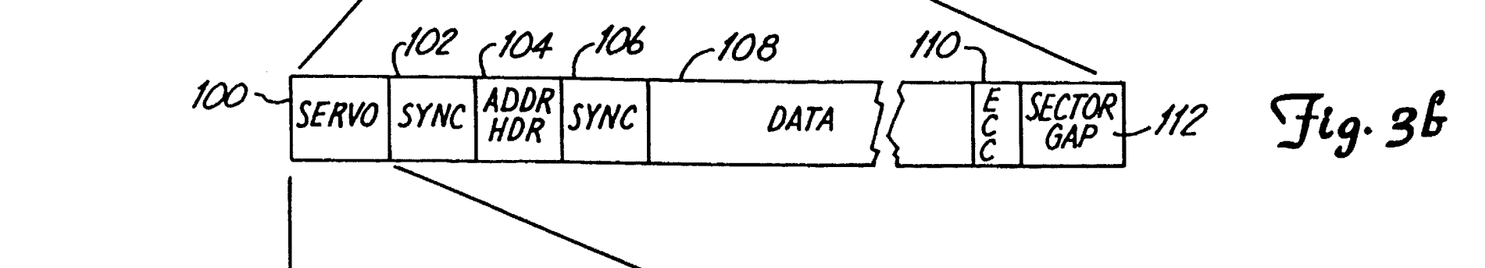
Figure 3C:
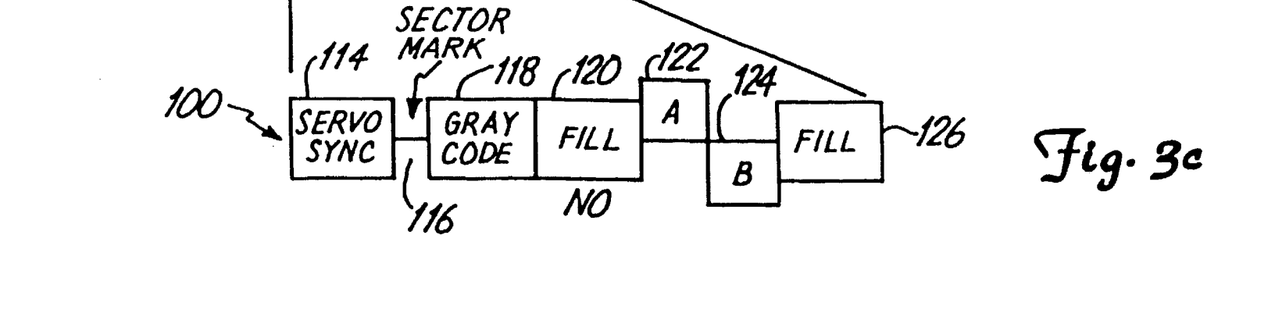

Referring now to FIGS. 3a–c, there is illustrated an exploded diagram showing the format and constituency of a representative data sector of one of the data tracks of the disks 22a–d, as used in a prior art, conventional disk drive. FIG. 3a represents a portion of a sequence of data sectors recorded in the form of magnetic transitions within the radial extent of the data track. The data sectors are labeled $N_{-1}$, $N_0$, $N_1$ and $N_2$. The sequence of data sectors extends around the entire circumferential length of the data track.

FIG. $3_b$ is an exploded view of the data sector $N_0$. The data sector $N_0$ is divided into a number of fields. The left most field comprises a servo field 100 that contains servo position information, as will be described in more detail in respect of FIG. 3c. The servo field 100 is followed by a sync field 102 containing recorded magnetic transitions that are used to synchronize the read and write electronics of the read/write control 36 to the frequency of magnetic transitions recorded on the disk surface in the following field.

Following the sync field 102 is an address header field 104 that contains magnetic transitions representing unique identification information for the specific data stored in the data sector $N_0$. In this manner, the disk drive system can locate and verify the exact data sector for any particular block of data that a host computer may require in a read operation. Included in the address header field 104 is head identification information to specify which one of the heads 24a–h is actually active and transmitting signals to or from the pre-amplifier 31. Another sync field 106 follows the address header field 104.

Actual data are stored in the next data field 108, which is followed by an error correcting field 110. The error correcting field 110 includes magnetic transitions representing information that is redundant of the data recorded in the data field 108. The error correcting information is used by the read/write control 36 to detect and correct errors that may occur during a read operation, using known error correcting techniques. A sector gap 112 follows the error correcting field 110 to physically separate the data sector $N_0$ from the following data sector $N_1$.

Referring now to FIG. 3c, each servo field 100 comprises position information that is used to control the radial position of the actuator arms 28a–h, e.g., during a read operation. A servo sync field 114 is used to synchronize the read and write electronics of the read/write control 36 to the frequency of magnetic transitions representing position information within the servo field 100. A sector mark 116 is a recorded transition that is used by the read/write control electronics to determine the beginning of the data sector $N_0$. The read/write control electronics uses the sector mark 116 to time the beginning of processing of electric signals transduced by the head over data sector $N_0$.

A Gray code field 118 follows the sector mark 116. The Gray code field 118 contains coded information that indicates the track number where data sector $N_0$ is located. This information is used to locate a particular data track during a seek operation, as described above, by providing a unique identification for each data track on the respective disk surface. The Gray code field 118 is followed by a fill field 120 to separate the Gray code from the remaining servo field information comprising a servo pattern including an A burst 122 and a B burst 124.

As illustrated in FIG. 3c, the A and B bursts are arranged to straddle the centerline of the data sector $N_0$, with the A burst 122 positioned above the centerline, as shown in the example of FIG. 3c, and the B burst 124 positioned below the centerline. Each of the A and B bursts comprises a series of magnetic transitions of alternating north/south, south/north magnetic pole transitions which result in a series of electrical signals, when the transitions of the A and B bursts of the data sector $N_0$ are transduced by a corresponding head 24a–h, as the disk rotates.

The width of the head 24a–h positioned above the data sector $N_0$ is approximately equal to the radial extent or width of the sector. As discussed, during a read or write operation, the head 24a–h must be centered over the sector $N_0$ to properly transduce only magnetic transitions of the sector $N_0$ into corresponding electric signals. If the head 24a–h is off-center, the head 24a–h may begin to transduce transitions from data sectors of an adjacent track, resulting in an incorrect data read or write.

During operation of the disk drive, each time a head 24a–h is over a pair of A and B bursts, the signals transduced by the head 24a–h are transmitted to the microprocessor 35, which sums all of the signals from the A burst 122, sums all of the signals from the B burst 124, and subtracts one of the sum values from the other to obtain a subtraction result comprising a difference value. When the head 24a–h is properly position over the centerline, the difference value is zero. When the difference value is non-zero, that indicates that the head 24a–h is off-center.

For example, if the head 24a–h is completely off-center, above the centerline shown in FIG. 3c, the head 24c will transduce all of the transitions of the A burst 122, but none of the transitions of the B burst 124. The difference value will equal the sum of the transitions of the A burst 122 since the B burst sum will have a zero value. This result signals the microprocessor 35 to control the actuator arm 28a–h, via the actuator control 40, to move the head 24a–h toward the centerline, until the difference value is again zero.

Figures 4A, 4B:
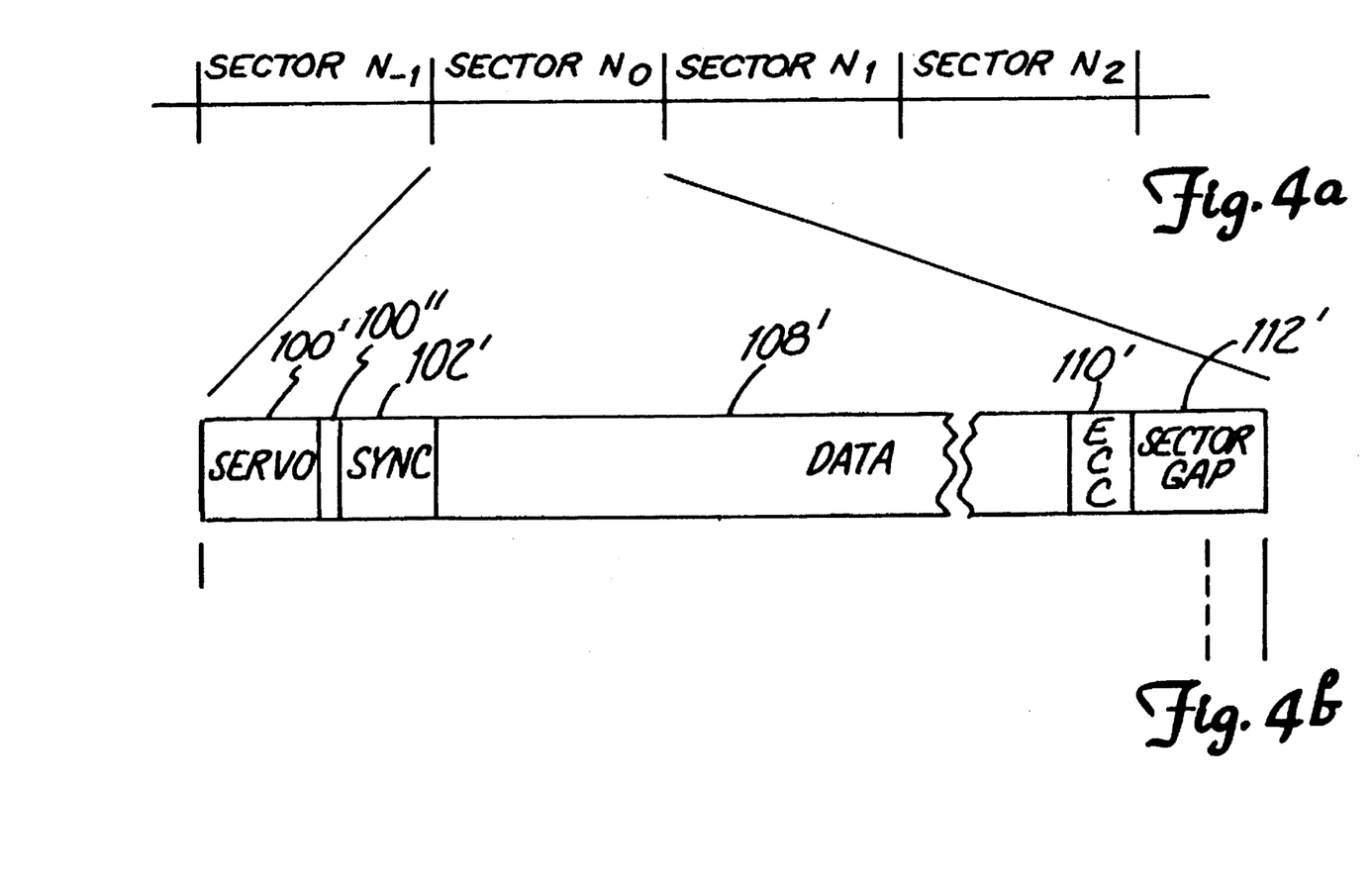
FIGS. 4a–b present a diagrammatic explosion of the format and constituency of a representative data sector according to the present invention, as recorded within the data tracks of the disks of the disk drive of FIG. 1.

FIGS. 4a and 4b illustrate the format and constituency of a representative data sector of the type used in connection with the present invention. The aspects of the format similar to the conventional format are indicated by like reference numerals, modified by a prime symbol "'", for convenience. The notable differences between the format shown in FIGS. 4a and 4b and the conventional format illustrated in FIGS. 3a–c are the absence of an address header field and the addition of a head identification information field 100" within the servo field 100' of FIGS. 4a and 4b.

In the format of FIGS. 4a and 4b, the disk surface space ordinarily occupied by the address header field 104 (see FIGS. 3a–c) is now used to expand the circumferential length of the data field 108' for the storage of additional data. A small amount of the overhead imposed by the address header information, namely the head identification information (head identification field 100"), is relocated into the servo field 100' for use during certain failure conditions to identify the actual head 24a–h that is active, as will be explained in more detail below.

As discussed above, the information usually contained within the address header field is stored, e.g. in the RAM 43. Monitoring clock signals from the time of detection of a sector mark 116 can be relied upon to associate a data field with a corresponding header in the RAM 43 to identify the data block stored in the data field being read or written. Whenever a failure condition exists resulting in the inability of the electronics to determine which head is active, the active head reads the head identification information now stored in the servo field 100' for confirmation of its identification.

The servo fields 100, 100' are recorded onto the disk surfaces during the manufacture of the disk drive. For maximum efficiency, the heads 24a–h of the disk drive are used to complete a multi-head write operation to simultaneously write A and B burst servo patterns onto all of the disk surfaces in parallel.

Figure 5:
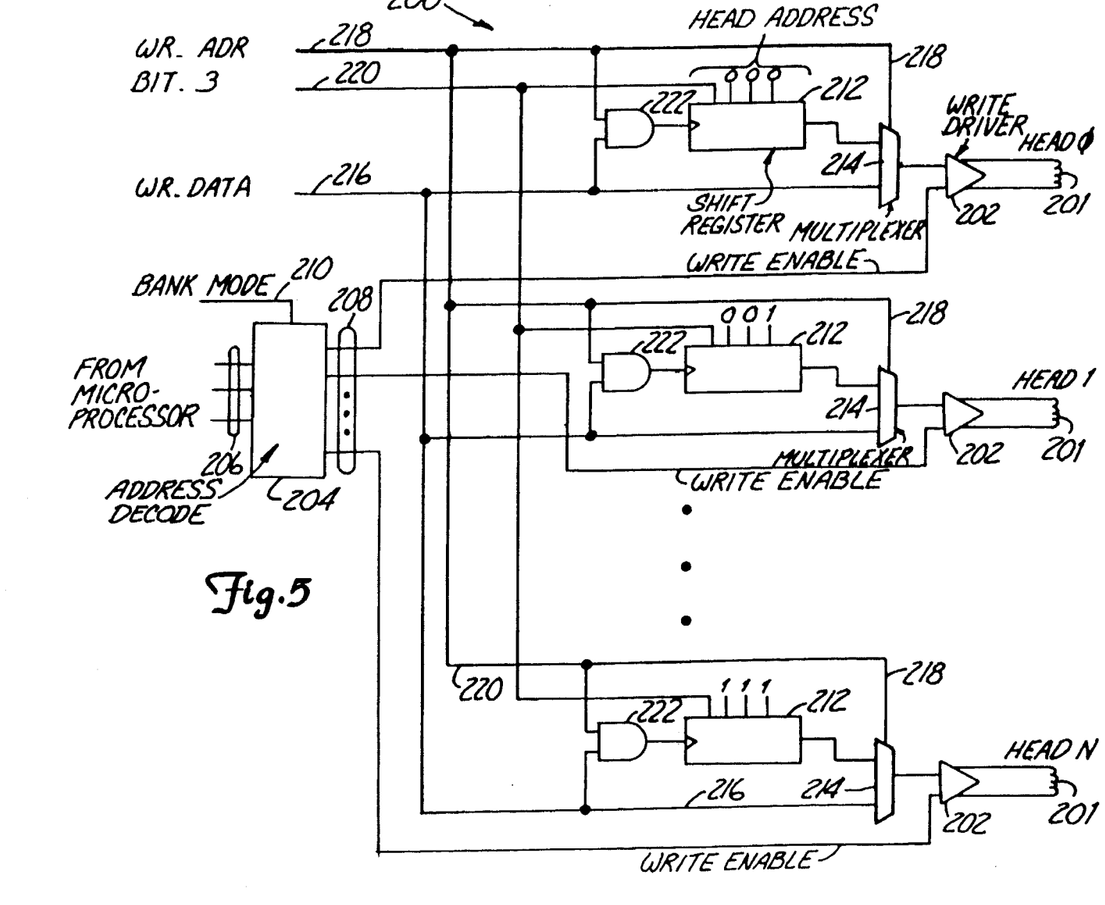
FIG. 5 is a block diagram of a logic circuit, according to the present invention, which is incorporated in the preamplifier of the disk drive of FIG. 1 for control of a multi-head write operation.

Referring now to FIG. 5, there is illustrated, in block diagram form, a write logic circuit 200 according to the present invention. The write logic circuit 200 is incorporated into the pre-amplifier 31 of the disk drive of FIG. 1 for control of either a multi-head write operation or a normal data write operation, as will appear. In FIG. 5, the heads 24a–h are represented schematically by coils 201. As well known, a coil generates a magnetic field when an electric current is conducted through the coil. This principle is utilized in a disk drive to write data as magnetic transitions within data tracks on the disk surfaces. Each coil acts as the transducer to convert an electric signal representing data to a magnetic field recorded onto a disk surface.

As shown in FIG. 5, the coils 201 are coupled to respective write drivers 202. Each write driver 202 includes an input that receives an electric signal containing encoded data, as is well known. The electric signal is transmitted by the pre-amplifier 31 to a selected write driver 202, causing the selected write driver 202 to energize the respective coil 201 as a function of the encoded data to thereby magnetize the corresponding disk surface during rotation of the corresponding disk. The electric signal causes a series of magnetic transitions to be written onto the disk surface corresponding to the selected write driver/coil pair, with the series of magnetic transitions being representative of the data encoded in the electric signal energizing the particular coil 201 via the write driver 202.

An address decode circuit 204 is coupled to address lines 206 that communicate a unique head identification number from the microprocessor 35. During normal data write operation of the disk drive, the unique head identification number communicated by the microprocessor 35 at any one time corresponds to the head 24a–h flying above the specific disk surface where data to be written are located. As is well known, the address decode circuit 204 decodes the unique head identification number applied to the address lines 206 into a corresponding one of a set of select lines 208 that is then activated by the address decode circuit 204. Each of the select lines 208 is coupled to an enable input of a respective one of the write drivers 202 that is coupled to a head 24a–h identified by the unique head identification number corresponding to the select line 208. When activated by the address decode circuit 204, a select line 208 enables the corresponding write driver 202 to write data, via the respective coil 201, to the corresponding disk surface, as will appear.

In this manner, the microprocessor 35 can keep track of the disk surface location of each data block stored in the disk drive, and thereafter, during a normal data write operation, control the selection of a particular head 24a–h as a function of the disk surface location of a current data block to be written. The address decode circuit 204 also includes a BANK MODE input line 210 that can be activated during a servo write operation. When activated, the BANK MODE input line 210 causes the address decode circuit 204 to activate all of the select lines 208 at the same time for a multi-head write to the disk surfaces.

Pursuant to the present invention, the write logic circuit 200 permits the writing of unique head identification information by each head 24a–h during a multi-head write operation, when the BANK MODE input line 210 is active. To that end, a memory device such as a shift register 212 is provided for each write driver 202. Each shift register 212 stores multiple bits having a unique value to identify the head 24 coupled to the corresponding write driver 202. An output of each shift register 212 is coupled to an input of a multiplexer 214. A second input of each multiplexer 214 is coupled to a common WR_DATA line 216. The WR_DATA line 216 is within the pre-amplifier 31 and transmits data to be written to a disk surface.

As is well known, a multiplexer includes a select input that operates to select one input to the multiplexer for output by the multiplexer, as a function of a signal applied to the select input. A select input of each multiplexer 214 used in the present invention, is coupled to a WR_ADR line 218. The WR_ADR line 218 is controlled to select one of the inputs to the multiplexers 214 for output to a corresponding write driver 202.

When the WR_ADR line 218 is in a first preselected state, the WR_DATA line 216 is selected for output by the respective multiplexer 214. When the WR_ADR line 218 is in a second preselected state, the shift register 212 is selected for output by the respective multiplexer 214. In the example of FIG. 5, the first preselected state comprises the WR_ADR line 218 asserted low and the second preselected state comprises the WR_ADR line 218 asserted high.

In accordance with an exemplary embodiment of the present invention, the most significant bit of each shift register 212 is coupled to a BIT_3 line 220. This feature can be used to implement a multiple pre-amplifier arrangement. The most significant bit (bit 3 in this example for a two pre-amplifier arrangement) can be activated by the microprocessor 35 to designate which pre-amplifier is to be used at a given time, and provide a unique common identification number for each head within a set of heads coupled to that pre-amplifier. The remaining bits of the shift register 212 (bits 0–2) are used to uniquely identify the particular head within the set of heads coupled to that pre-amplifier.

The three bit arrangement of this example permits a unique identification of up to eight different heads coupled to a single pre-amplifier. With a single most significant bit, up to two pre-amplifiers can be uniquely identified, to support and uniquely identify up to a total of sixteen different heads.

As in a conventional shift register, each of the shift registers 212 of the present invention includes a clock input to control the shifting of its bits to its output. As shown in FIG. 5, a clock input of each shift register 212 is coupled to an output of an AND gate 222. Each AND gate 222 includes two inputs, one coupled to the WR_ADR line 218, and the other coupled to the WR_DATA line 216. Thus, the unique identification bits of a shift register 212 will be shifted to its output, one at a time, and thereby applied to an input of the respective multiplexer 214, when both the WR_ADR and WR_DATA lines are active high. As described above, the WR_ADR line 218 is asserted high when selecting the contents of a shift register 212 for output by the respective multiplexer 214. In this manner, the selection of the shift register also acts as an enable signal for the corresponding AND gate 222.

When the WR_ADR line 218 is asserted high, each AND gate 222 will provide an output to the clock input of the corresponding shift register 212 only when the signal on the WR_DATA line 216 is also high. Pursuant to another feature of the present invention, the WR_DATA line 216 is used as a clock signal during the time the WR_ADR line 218 is asserted high. To that end, high pulses are provided on the WR_DATA line 218 at a preselected frequency, to shift bits out of each shift register 212 via the respective AND gate 222 (which provides an output pulse to the clock input of the corresponding shift register 212 each time the WR_DATA line 216 is pulsed high), at a rate suitable for application through the multiplexer 214 and write driver 202, to the head 24a–h such that transitions are properly recorded within the circumferential length of a head identification information field 100".

During a normal write operation of the write logic circuit 200, the WR_ADR line 218 is asserted low by the microprocessor 35 to select the common WR_DATA line 216 for output by the multiplexers 214 to each respective write driver 202. The microprocessor 35 also provides a unique head identification number on address lines 206 to select a particular head 24a–h for writing data to a disk surface containing the data block to be written. The address decode circuit 204 is responsive to the unique head identification number to select the select line 208 corresponding to the applied number for activation of the appropriate write driver 202. When activated, the selected write driver 202 energizes the corresponding coil 201 as a function of a data signal applied to the WR_DATA line 216. Thus, any one of the heads 24a–h can be activated at any one time to write data to a particular disk surface of the disk drive.

An example of a type of error condition that can occur in the disk drive is a malfunction of the address decode circuit 204. For example, the address decode circuit 204 can improperly decode a number applied by the microprocessor 35 to the address lines 206. Under such circumstances, the electronics of the disk drive expects data from a certain disk surface, when in fact a different head has been improperly selected by the address decode circuit 204. A recovery from this error condition can be achieved when using the headerless disk format of FIGS. 4a and 4b by having the active head 24a–h read the head identification number recorded in the head identification information fields 100" of the servo fields 100' of the disk surface. This information identifies the actual head activated by the address decode circuit 204.

As discussed above, the most efficient scheme for writing the servo fields 100' is to utilize the write logic circuit 200 in a multi-head write operation. During a servo write operation, the BANK MODE line 210 is asserted to cause the address decode circuit 204 to select all of the select lines 208 and thereby simultaneously activate all of the write drivers 202. The WR_ADR line 218 is asserted low to select the WR_DATA line 214 for output by the multiplexers 214. A servo pattern of A and B bursts is then applied to the WR_DATA line 216 to simultaneously write servo patterns to all of the disk surfaces.

However, according to the present invention, when the heads 24a–h are over a head identification information field 100" of a servo field 100', the BANK MODE line 210 is still asserted, but the WR_ADR line 218 is now asserted high to select the shift register 212 of each write driver 202 for output by the multiplexer 214. At the same time, a clock signal is applied to the WR_DATA line 216, as described above, to pulse the AND gates 222 and thereby shift the unique identification numbers stored in the shift registers 212 at an appropriate frequency, simultaneously through to the write drivers 202. Each write driver 202 will be activated by the assertion of the BANK MODE line 210 and, in addition, will be coupled to its corresponding shift register 212 through the respective multiplexer 214 due to the assertion high of the WR_ADR line 218. Accordingly, all of the write drivers 202 are writing in parallel, but each of the write drivers 202 is writing a unique head identification number from its shift register 212 to the corresponding disk surface.

We claim:

1. A write drive logic circuit, which comprises:

a set of write drivers, each one of the set of write drivers having an input and an output, each one of the set of write drivers being responsive to an input signal applied to the input to provide a write output signal at the output as a function of the input signal;

a set of shift registers, each one of the shift registers storing unique identification information and having an output to controllably output a signal representative of the unique identification information, each shift register includes a shift input to cause shifting of the unique identification information stored therein to the output of the shift register;

a set of multiplexers, each one of the multiplexers having an output, a first input coupled to a corresponding one of the outputs of the set of shift registers to receive the signal representative of the unique identification information stored in the one shift register, a second input and a select input to control the application of one of the first and second inputs of the multiplexer to the output of the multiplexer;

a common control line coupled to the select input of each multiplexer;

a common write data line for transmitting a signal representative of preselected information and being coupled to the second input of each multiplexer for input of the signal representative of preselected information to each multiplexer;

the output of each one of the set of multiplexers being coupled to the input of a corresponding one of the set of write drivers such that one of the first and second inputs of the multiplexer is selectively, applied to the input of the corresponding write driver; and a set of logic devices, each logic device having an output coupled to the shift input of a corresponding one of the set of shift registers, a first input coupled to the common control line and a second input coupled to the common write data line, the output of each logic device asserting an output pulse each time the state of the common control line and the signal transmitted on the common write data line are in a preselected logical relationship to one another.

2. The write drive logic circuit of claim 1, wherein the common control line, when in a first state, causes each multiplexer to select the signal transmitted on the common write data line for output by each multiplexer, and, when in a second state, causes each multiplexer to select the signal output by each respective shift register for output by each respective multiplexer.

3. The write drive logic circuit of claim 1 wherein the common write data line transmits a clock signal.

4. The write drive logic circuit of claim 1 wherein each logic device comprises an AND gate.

5. The write drive logic circuit of claim 1 wherein each one of the set of shift registers includes fixed and selectively variable memory locations for the unique identification information.

6. The write drive logic circuit of claim 1 wherein each write driver includes an enable input; and further comprising an address decode circuit having an input to receive unique head identification information, and a set of outputs, each output of the set being coupled to the enable input of one of the set of write drivers, the address decode circuit operating to decode the unique head identification information and activate one of its outputs as a function of the unique head identification information to enable a corresponding one of the write drivers, the address decode circuit further including a BANK MODE input and being responsive to a signal applied to the BANK MODE input to simultaneously activate all of its outputs to enable all of the write drivers.

7. A write drive logic circuit, which comprises:

a write driver, the write driver having an input and an output, the write driver being responsive to an input signal applied to the input to provide a write output signal at the output as a function of the input signal;

a memory device, the memory device storing unique identification information and having an output to controllably output a signal representative of the unique identification information, a control input to cause output of the unique identification information to the output of the memory device;

a multiplexer, the multiplexer having an output, a first input coupled to the output of the memory device to receive the signal representative of the unique identification information stored in the memory device, a second input and select input to control the application of one of the first and second inputs of the multiplexer to the output of the multiplexer;

a control line coupled to the select input of the multiplexer, a write data line for transmitting a signal representative of preselected information and being coupled to the second input of the multiplexer for input of the signal representative of preselected information to the multiplexer;

the output of the multiplexer being coupled to the input of the write driver such that one of the first and second inputs of the multiplexer is selective applied to the input of the write driver; and a logic device, the logic device having an output coupled to the clock input of the memory device, a first input coupled to the control line and a second input coupled to the write data line, the output of the logic device asserting an output pulse each time the state of the control line and the signal transmitted on the common data line are in a preselected logical relationship to one another.

8. The write drive logic circuit of claim 7 wherein the memory device comprises a shift register.

9. The write drive logic circuit of claim 7, wherein the control line, when in a first state, causes the multiplexer to select the signal transmitted on the write data line for output by the multiplexer, and, when in a second state, causes the multiplexer to select the signal output by the memory device for output by the multiplexer.

10. The write drive logic circuit of claim 7 wherein the write data line transmits a clock signal.

11. The write drive logic circuit of claim 7 wherein the logic device comprises an AND gate.

12. The write drive logic circuit of claim 7 wherein the memory device includes fixed and selectively variable memory locations for the unique identification information.

13. A write drive logic circuit, which comprises:

a common write data line for transmitting a signal representative of preselected information;

a set of write driver circuits, each one of the set of write driver circuit including:

a write driver having an input and an output, the writer driver being responsive to an input signal applied to the input to provide a write output signal at the output as a function of the input signal, a memory device, the memory device storing unique identification information and having an output to controllably output a signal representative of the unique identification information, and a multiplexer, the multiplexer having an output coupled to the input of the write driver, a first input coupled to the output of the memory device to receive the signal representative of the unique identification information stored in the memory device and a second input coupled to the common write data line to receive the signal representative of preselected information, such that one of the first and second inputs of the multiplexer is selectively applied from the output of the multiplexer to the input of the write driver;

an address decode circuit having an input to receive unique head identification information, and a set of outputs, each output of the set being coupled to a respective one of the write drivers, the address decode circuit operating to decode the unique head identification information and activate one of its outputs as a function of the unique head identification information to enable a corresponding one of the write drivers, the address decode circuit further including a BANK MODE input and being responsive to a signal applied to the BANK MODE input to simultaneously activate all of its outputs to enable all of the write drivers; and a WR_ADR line coupled to each multiplexer, the WR_ADR line, when in a first state, causes each multiplexer to select the signal transmitted on the common write data line for output by each multiplexer, and, when in a second state, causes each multiplexer to select the signal output by each respective memory device for output by each respective multiplexer.

14. A write drive logic circuit, which comprises:

a set of write drivers, each write driver having an input and an output, each write driver being responsive to an input signal applied to the input to provide a write output signal at the output as a function of the input signal;

a set of memory devices, each memory device storing unique identification information and having an output to controllably output a signal representative of the unique identification information and a control input to cause output of the unique identification information to the output of the memory device;

a set of multiplexers, each multiplexer having an output, a first input coupled to an output of a corresponding memory device to receive the signal representative of the unique identification information stored in the corresponding memory device, a second input and a select input to control the application of one of the first and second inputs of the multiplexer to the output of the multiplexer;

a common control line coupled to the select input of each multiplexer;

a common write data line for transmitting a signal representative of preselected information and being coupled to the second input of each multiplexer for input of the signal representative of preselected information to each multiplexer;

the output of each multiplexer being coupled to the input of a corresponding write driver such that one of the first and second inputs of the multiplexer is selectively applied to the input of the corresponding write driver; and a set of logic devices, each logic device having an output coupled to the control input of a corresponding memory device, a first input coupled to the common control line and a second input coupled to the common write data line, the output of each logic device asserting an output pulse each time the state of the common control line and the signal transmitted on the common write data line are in a preselected logical relationship to one another.

15. The write drive logic circuit of claim 14, wherein the common control line, when in a first state, causes each multiplexer to select the signal transmitted on the common write data line for output by each multiplexer, and, when in a second state, causes each multiplexer to select the signal output by each respective memory device for output by each respective multiplexer.

16. The write drive logic circuit of claim 14 wherein the common write data line transmits a clock signal.

17. The write drive logic circuit of claim 14 wherein each logic device comprises an AND gate.

18. The write drive logic circuit of claim 14 wherein each memory device comprises a shift register.

19. The write drive logic circuit of claim 17 wherein each shift register includes fixed and selectively variable memory locations for the unique identification information.

20. The write drive logic circuit of claim 14 wherein each write driver includes an enable input; and further comprising an address decode circuit having an input to receive unique head identification information, and a set of outputs, each output of the address decode circuit being coupled to the enable input of a corresponding write driver, the address decode circuit operating to decode the unique head identification information and activate one of its outputs as a function of the unique head identification information to enable the corresponding one of the write drivers, the address decode circuit further including a BANK MODE input and being responsive to a signal applied to the BANK MODE input to simultaneously activate all of its outputs to enable all of the write drivers.

* * * * *

UNITED STATES PATENT AND TRADEMARK OFFICE
CERTIFICATE OF CORRECTION

PATENT NO. : 5,570,241

DATED : OCTOBER 29, 1996

INVENTOR(S) : CHARLES R. NIELSEN, CHARLES A. BATES, MATTHEW W. ROOKE, FRED R. HANSEN, PAUL T. PETERSEN, ME V. LEE, EUGENE K. LEW

It is certified that error appears in the above-indentified patent and that said Letters Patent is hereby corrected as shown below:

Col. 2, line 2, delete "slack", insert --stack--

Col. 3, line 42, after "operation", insert --.--

Col. 3, line 42, delete "when", insert --When--

Col. 5, line 26, delete "am", insert --arm--

Col. 6, line 57, delete "$3_b$,", insert --3b--

Col. 12, line 15, after "selectively", delete ","

Signed and Sealed this

Fourth Day of March, 1997

Attest:

Attesting Officer

BRUCE LEHMAN

Commissioner of Patents and Trademarks